United States Patent
Vuoristo

(10) Patent No.: US 11,755,831 B2
(45) Date of Patent: Sep. 12, 2023

(54) DETECTION OF A TOPIC

(71) Applicant: Telia Company AB, Solna (SE)

(72) Inventor: Aleksanteri Vuoristo, Klaukkala (FI)

(73) Assignee: TELIA COMPANY AB, Solna (SE)

(*) Notice: Subject to any disclaimer, the term of this patent is extended or adjusted under 35 U.S.C. 154(b) by 184 days.

(21) Appl. No.: 17/061,989

(22) Filed: Oct. 2, 2020

(65) Prior Publication Data
US 2021/0103698 A1    Apr. 8, 2021

(30) Foreign Application Priority Data
Oct. 4, 2019    (EP) .................................... 19201386

(51) Int. Cl.
| | |
|---|---|
| *G06F 40/205* | (2020.01) |
| *G06F 40/289* | (2020.01) |
| *G06Q 30/016* | (2023.01) |
| *H04L 51/04* | (2022.01) |
| *G06F 16/31* | (2019.01) |
| *G06F 16/33* | (2019.01) |
| *G06F 16/35* | (2019.01) |

(52) U.S. Cl.
CPC .......... *G06F 40/205* (2020.01); *G06F 16/316* (2019.01); *G06F 16/3347* (2019.01); *G06F 16/355* (2019.01); *G06F 40/289* (2020.01); *G06Q 30/016* (2013.01); *H04L 51/04* (2013.01)

(58) Field of Classification Search
None
See application file for complete search history.

(56) References Cited

U.S. PATENT DOCUMENTS

| | | |
|---|---|---|
| 7,899,871 B1 | 3/2011 | Kumar et al. |
| 2016/0330144 A1 | 11/2016 | Dymetman et al. |
| 2020/0186482 A1* | 6/2020 | Johnson, III ......... G06Q 10/109 |

OTHER PUBLICATIONS

Paritosh Pantola, "Natural Language Processing: Text Data Vectorization", Jun. 14, 2018, 12 pages, https://medium.com/@paritosh 30025/natural-language-processing-text-data-vectorization-af2520529cf7.
Search Report for EP Application No. 19 20 1386 dated Jan. 14, 2020, 2 pages.
Office Action issued in European Patent Application No. 19201386.0 dated Sep. 12, 2022.

* cited by examiner

*Primary Examiner* — Quynh H Nguyen
(74) *Attorney, Agent, or Firm* — NIXON & VANDERHYE

(57) ABSTRACT

The present invention relates to a method for performing a detection of a topic of a message introduced in a real-time customer service messaging platform. In the method a message comprising at least one word from which the topic is definable is received; a topic from the received message is extracted; it is inquired from a database if the topic is determinable from a number of messages received chronically earlier than the received message; and an indication is generated to an operator of the real-time customer service messaging platform in accordance with a detection result obtained through an inquiry to the database. Some aspects of the present invention relate to a network node, to a computer program product and to a system.

8 Claims, 2 Drawing Sheets

DETECTION OF A TOPIC

TECHNICAL FIELD

The invention concerns in general the technical field of communications. More particularly, the invention concerns a management of messaging.

BACKGROUND

In real-time messaging solutions, such as in chat solutions, parties may compose messages to a messaging platform and the messages are published to at least one other party in a due course. This kind of real-time messaging solutions may also be applied to in a real-time customer service messaging platform wherein customers may insert messages to the messaging platform with their personal computing devices and a customer service agent reads the messages and takes necessary actions with respect to the received messages, such as provides responses and instructions to the matters disclosed in the messages.

The customer service systems are traditionally implemented so that as the message is received the customer service agents finds a topic from the message and initiates manual search from a database to find information on the topic in question. This may turn out to be slow and cumbersome especially because the customer service agent cannot be prepared for the topics coming through the customer service messaging platform and, typically, response is expected at once the message is sent in the system.

In the above described environment it would be good to prepare in advance to topics raising up from the real-time messaging solutions serving as the customer service system. Hence, there is need to develop the real-time messaging solutions to allow improved service level especially in the customer service area.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An object of the invention is to present a method, a network node, a computer program product and a system at least for performing a detection of a topic of a message.

The objects of the invention are reached by a method, a network node, a computer program product and a system as defined by the respective independent claims.

According to a first aspect, a method for performing a detection of a topic of a message introduced in a real-time customer service messaging platform is provided, the method performed by a network node comprises: receiving a message comprising at least one word from which the topic is definable; extracting a topic from the received message; inquiring from a database if the topic extracted from the received message is determinable from a number of messages received chronologically earlier than the received message; and generating an indication to an operator of the real-time customer service messaging platform in accordance with a detection result obtained through an inquiry to the database.

For example, the extracting of the topic may be performed by: dividing the received message to sub-sentences; generating a vector representation of the sub-sentences; allocating timestamp to each vectorized sub-sentence; and organizing data in the database at least in accordance with allocated timestamps of the vectorized sub-sentences.

Moreover, the indication may be generated to inform the operator of the realtime customer service messaging platform that the extracted topic from the received message is determinable among the number of messages received chronologically earlier than the received message within a predefined time window.

Still further, the indication may be generated as a signal causing a visual effect on a display of a terminal device of the operator of the real-time customer service messaging platform.

According to a second aspect, a network node for performing a detection of a topic of a message introduced in a real-time customer service messaging platform is provided, the network node comprising: at least one processor; and at least one memory including computer program code; the at least one memory and the computer program code configured to, with the at least one processor, cause the network node to: receive a message comprising at least one word from which the topic is definable; extract a topic from the received message; inquire from a database if the topic extracted from the received message is determinable from a number of messages received chronologically earlier than the received message; and generate an indication to an operator of the real-time customer service messaging platform in accordance with a detection result obtained through an inquiry to the database.

For example, the network node may be arranged to perform the extracting by: dividing the received message to sub-sentences; generating a vector representation of the sub-sentences; allocating timestamp to each vectorized sub-sentence; and organizing data in the database at least in accordance with allocated timestamps of the vectorized sub-sentences.

Moreover, the network node may be arranged to generate the indication to inform the operator of the real-time customer service messaging platform that the extracted topic from the received message is determinable among the number of messages received chronologically earlier than the received message within a predefined time window.

Still further, the network node may be arranged to generate the indication as a signal causing a visual effect on a display of a terminal device of the operator of the real-time customer service messaging platform.

According to a third aspect, a computer program product for performing a detection of a topic of a message introduced in a real-time customer service messaging platform is provided which computer program product, when executed by at least one processor, cause a network node to perform the method as described in the foregoing description in accordance with the first aspect.

According to a fourth aspect, a system for performing a detection of a topic of a message introduced in a real-time customer service messaging platform is provided, the system comprising: a first terminal device operated by a customer service agent; a second terminal device operated by a customer for contacting a customer service; a database for storing data relating to one or more messages delivered in the real-time customer service messaging platform; and a network node as described in the foregoing description in accordance with the second aspect.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication environment into which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
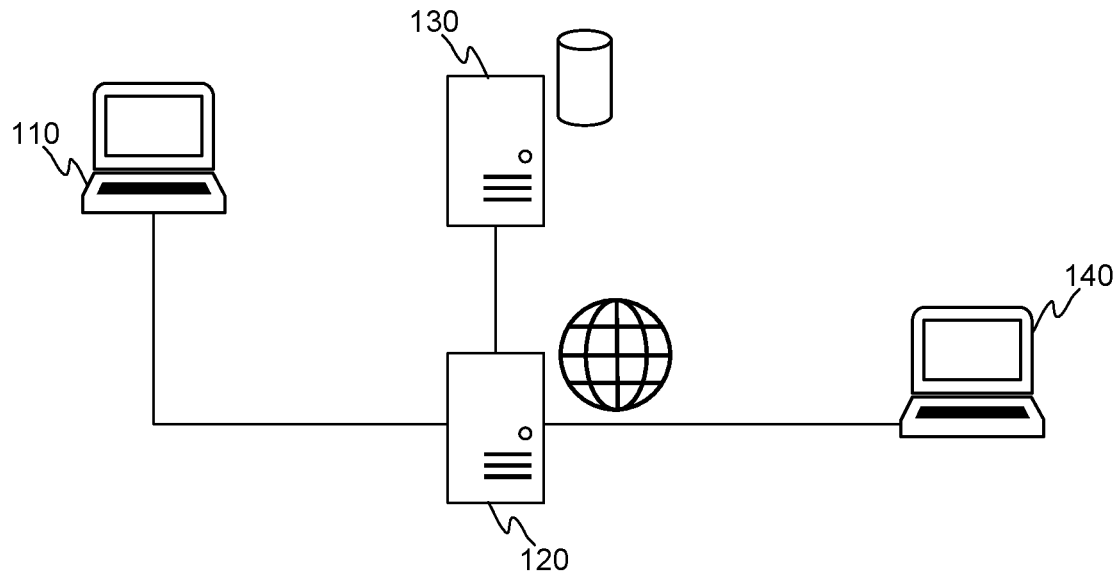

FIG. 1 illustrates schematically a communication environment into which the present invention may be implemented to. The communication environment, or a system, may comprise a first terminal device 110 and a second terminal device. The first terminal device 110 shall be considered to serve as a customer service agent and the second terminal device 140 shall be considered as a terminal device used by a customer contacting the customer service. The communication between the first and the second terminal device is performed through a network node 120. The network node 120 may e.g. be arranged to operate as a server device hosting a communication service by means of which real-time messaging may be implemented. In other words, the network node 120 may be arranged to implement a real-time messaging platform enabling a communication between the first terminal device 110 and the second terminal device 140. The communication environment also comprises a database 130, or any similar data storage, arranged to store data used for implementing at least some portions of the solution according to example embodiments. The database 130 may be accessed at least through the network node 120.

Figure 2:
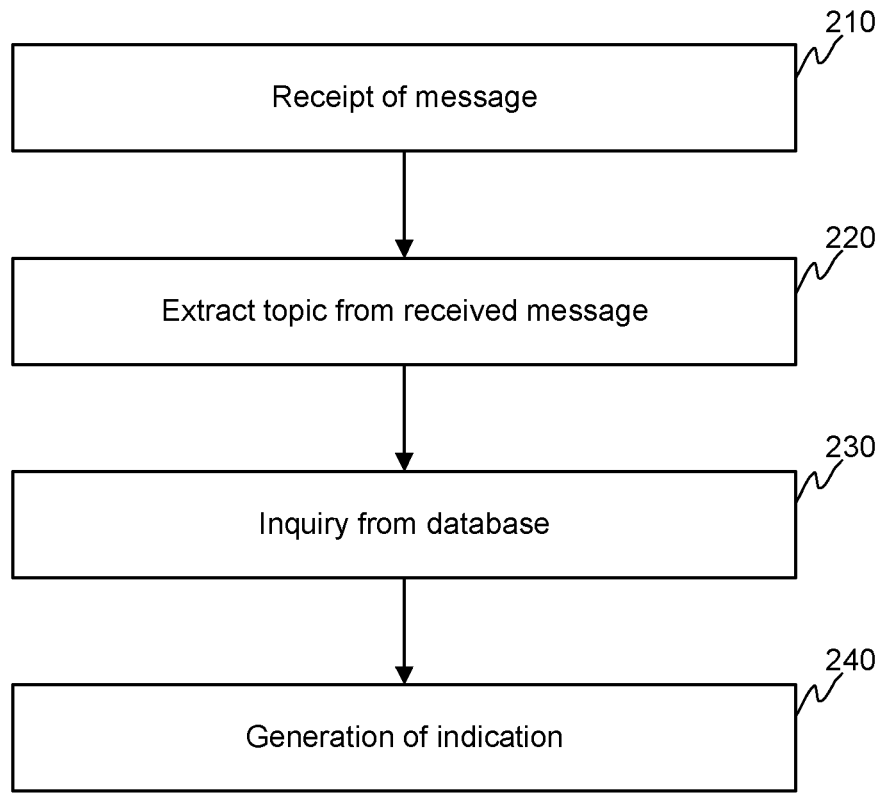
FIG. 2 illustrates schematically a method according to an example embodiment.

Next, a method according to an example embodiment is described by referring to FIG. 2. The method is described from the network node 120 point of view. First, a customer may compose a message with his/her terminal device 140 and in response to a delivery of the message by the customer it is received 210 by the network node 120. In response to the receipt of the message, the network node 120 may be arranged to extract 220 a topic from the received message.

The extraction of the topic from the message may be performed by analyzing a string of characters in the message in a manner as will be described.

Now, the network node 120 may be arranged to inquire 230 from a data storage entity, such as from a database 130, if the topic extracted from the received message is determinable from a number of messages received chronologically earlier than the received message. In other words, the database may be arranged to store at least part of messages received by the network node 120 from e.g. customers. Additionally, some other data may be stored in the database 130 which data is inquireable from the database 130.

In response to a receipt of information to the inquiry from the database 130 the network node 120 may be arranged to generate 240 an indication in accordance with a detection result obtained through an inquiry to the database 130. The indication may be a signal causing at least the first terminal device 110 to generate an output which provides the operator of the first terminal device 110 information if the topic extracted from the received message may be found from data stored in the database 130 i.e. the topic may be determined from a number of messages received chronologically earlier than the received message. In various example embodiments the indication may comprise further data, such as the earlier messages including the same topic as the received message in question. The output may e.g. be visual, audio, haptic or any similar output e.g. with a display device of the terminal device 110.

The generation of the indication 240 may refer to an implementation that the network node 120 generates the indication based on the data received from the database 130. Alternatively, the database 130 may be arranged to prepare the indication at least in part and the network node 120 finalizes it if needed, and at least generates a signal carrying the indication, such as a data string in a predefined format, to the first terminal device 110.

Figure 3:
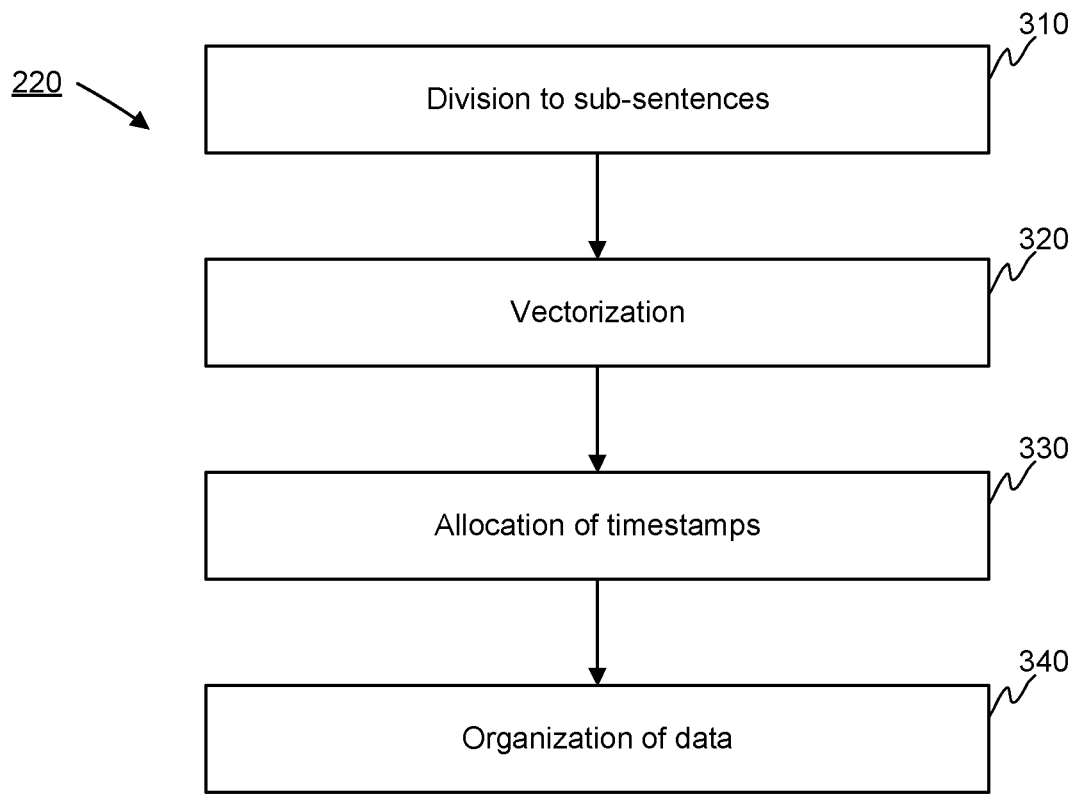
FIG. 3 illustrates schematically further aspects relating to a method according to an example embodiment.

In the following it is described at least some aspects with respect to a determination, or an extraction, of a topic from received messages by referring to FIG. 3. The extract of the topic 220 may be performed so that the data included in the messages may be divided to sentences. For each sentence, the sentence may further be divided to sub-sentences 310 of length n. The conversion to sub-sentences may be performed in accordance with the following formula:

$$Nsen=[w1,w2,\ldots wn]_1,[w2,w3,\ldots wn+1]_2,\ldots,\\ [wlsen,wlsen+1\ldots wlsen+n]_{lsen},$$

where w=word of the sentence consisting of a string of characters, n=length of sub-sentence, lsen=length of sentence—(n−1).

As mentioned, in accordance with the method the sentences may be divided to sub-sentences 310 where the length of the sub-sentence is n. For example, if n=1, every word in the sentence forms a sub-sentence. If n=2, the sentence will be split to sub-sentences of length 2 words. For example, the sentence "Mobile phone sold to client" may be converted to sub-sentences "Mobile phone", "Phone sold", "Sold to", "to client". If n=3, the sub-sentences would be "Mobile phone sold", "Phone sold to", "Sold to client".

Next, every word is vectorized 320 with a word-vectorizer algorithm and the vectors within a sub-sentence may e.g. be combined by adding or multiplying them together, or performing some other mathematical action to combine them in a way that best suits the data. Vector conversion may e.g. be implemented by means of a machine-learning system in which a word-vectorizer algorithm may be trained with applicable training data, such as with a domain data formed from the messages collected over time in the real-time messaging platform.

In other words, the data in the message expressed as the sentence may be converted to a vector representation of its sub-elements. Next, the network node 120 may be arranged to allocate a timestamp 330 to each sub-element on a vector space, and identify clusters of sub-sentences that have been created or have significantly grown at some point in the data. Moreover, the data stored in the database 130 may be increased by extracting new clusters of a certain time frame, such as 24 hours, by only keeping data points of that time frame (as "positive vectors") and all previous time frames, such as 7 days not including the certain time frame of 24 hours, and use all data points of previous time frames as "negating points". The allocation of the timestamps 330 to sub-sentences may be based on a clock signal applied in the network node 120, such as internal clock signal used for internal processing operations. The provision of the timestamps based on the clock signal applied in the network node 120 allows a comparison between the sub-sentences in accordance with the timestamp.

More specifically, extraction of rising themes, or topics, may e.g. be tuned by allocating timestamps for each sub-sentence. While it is more straightforward to treat historical data as equal "negating points", meaning that it does not affect the topic extraction algorithm whether a single sub-sentence was added to database one day ago or five days ago, taking that time difference into account has its uses.

Hence, both the positive and negative time frames are considered to be subject to changes in order to tune the system to each type of data.

The allocated timestamps may be treated as the difference in time to current point in time. The easiest way to calculate this is to use timestamps obtainable from the system executing the method. A non-limiting example of an applicable timestamp may be so-called Unix Timestamps in Unix operating system. The difference of current time and a timestamp 24 hours ago is 86400 Unix Epochs in Unix operating system, or seconds. From herein the difference in seconds will be called "Unix Difference".

By taking Unix Difference into account, it is possible to choose to highlight either topics that might repeat often (such as certain types of areal service malfunctions) or novel topics (such as a manufacturing error in a new product).

For example, if exclusively novel topics are highlighted, we may select the Unix Difference affect the points surrounding a negating vector point linearly. This means that the larger the Unix Difference is, the more its vector point dampens its surrounding points. Hence, a message that is a day old will dampen its neighbors less than a message that is 3 days old. As a result, new topics may be highlighted, and as time passes, they are slowly faded away. A non-limiting example in which the above-described approach may be applied to is in a context when there exist problems related to a recently released product, where quick response time is the key, but as the problem becomes common knowledge among customer service agents, its importance to be highlighted is diminished.

Further, for topics, or themes, that repeat yet demand a quick response, an inverse linearity may be used. The larger the Unix Difference, the smaller the effect of a negating vector point to its surrounding points. A message that is a day old will dampen its neighbors more than a message that is 3 days old. This will heighten themes of the positive vectors without punishing them for having existed at a point further back in historical data.

The above given situations are only examples, and should not be considered as an exhaustive list of options. Depending on the type of data, different and more complex formulas to treat timestamps could be used. Moreover, the implementation of timestamps may vary from the above.

As a conclusion of above it may be considered that the negating points subtract from the value of positive vectors by a factor of weight and distance. Weight means the amount of times the sub-sentence was found. Positive vectors add to the value of their surrounding positive vectors by a factor of weight and distance. This means that the closer positive neighbors a sub-sentence has, the higher its value.

As a result of the above-described mechanism, dense groups of sub-sentences that have only rarely been seen in data history have the highest values and all sub-sentences that are common throughout history are negated away. For each sentence in a certain date, a value may be calculated that represents how much a new rising theme is present in the sentence. In the described manner it is possible to find sentences with the highest value for inspection. In other words, the network node 120 may identify the earlier messages, and/or sentences therein, and to indicate if one or more topics in a present message already exist in earlier messages.

To create a vector space, the time periods must be chosen. As a non-limiting example, as given as an example above, it may be defined that all the messages from e.g. the previous 24 hours may be considered as positive vectors and all messages from e.g. previous 14 days from that may be considered as negative vectors. Negative and positive vectors are loaded to the network node 120 from database 130 as vectorized sub-sentences with timestamps. The vector space may e.g. created in the network node 120. When the network node 120 receives new sub-sentences from a second terminal device 140 i.e. from the customer terminal, the scores of these sub-sentences may be calculated with the vector space to check for possible rising themes. These sub-sentences may then be collected so that they may automatically be added to the vector space later.

As the query for a sub-sentence is made and the nearest vector points are returned, the timestamps of those points may be checked and compared to current time. This way the past 24 hour limit for positive vectors may be arranged to be always up-to-date.

In some example embodiments, the new sub-sentences may also be uploaded to the database 120 in predetermined intervals. Similarly, in predetermined intervals the network node 120 may be arranged to download all new sub-sentences from the database 130 and to update its vector space to include also the new sub-sentences collected by all other network nodes 120. This kind of arrangement may be especially advantageous e.g. in an environment where a plurality of customer service agents are serving clients through a plurality of network node 120 and wherein it is preferable to receive information on topics in other network nodes 120 in order to provide improved service to customers since the awareness of the rising topics is increased through an exchange of information.

As derivable from the foregoing description, the data may be organized 340 in the database based on sub-sentences as well as timestamps. The organization may also refer to the clustering of data e.g. into new clusters in accordance with the time, for example. In other words, with the present solution it is possible to pre-define one or more time windows to be applied with the topic of the received message.

By extracting rising topics, or themes, from the messages in the real-time messaging platform applied in a customer service allows an improved service to customers because the system helps the customer service agent to prepare and find to "hot topics" in an efficient manner, and even in advance.

A non-limiting example of an application area of the above described mechanism may be the real-time customer service messaging platform into which customer may send messages and inquire information from one or more topics.

Now, the real-time customer service messaging platform may analyze the received messages in the manner as described in the foregoing description and in that manner to generate data to be applied with inquiries to the database 130 as well as to allow the customer agent to prepare to customer service situation through the messaging platform in optimal manner.

In various embodiments of the invention the inquiry to the database 130 may be performed automatically by the network node 120 and the result of the inquiry may be indicated to the operator. Further, in some example embodiments the network node may determine new topics among the received message stream and to generate an indication, such as a pop-up window, to the operator.

Figure 4:
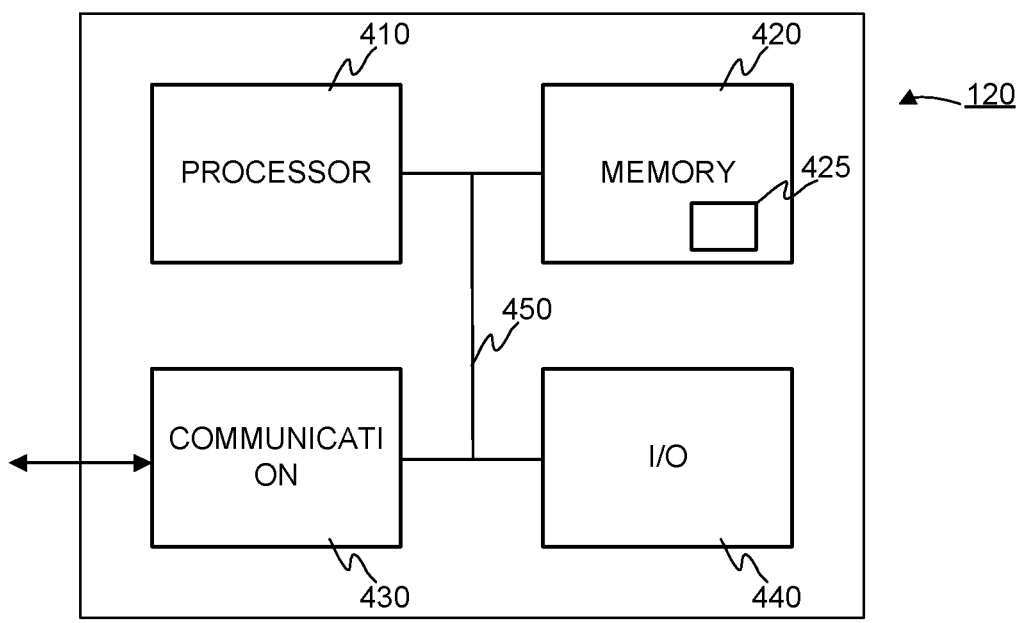
FIG. 4 illustrates schematically a network node according to an example embodiment.

As discussed above, the network node 120 may perform at least some steps of the method as described. FIG. 4 illustrates schematically as a block diagram a non-limiting example of the network node 120 applicable to perform the method. The block diagram of FIG. 4 depicts some components of an apparatus that may be employed to implement an operation of the network node 120.

The apparatus comprises a processor 410 and a memory 420. The memory 420 may store data and computer program code 425. The apparatus may further comprise communication means 430 for wired and/or wireless communication with other apparatuses. Furthermore, I/O (input/output) components 440 may be arranged, together with the processor 410 and a portion of the computer program code 425, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus may be communicatively coupled to each other via a bus 450 that enables transfer of data and control information between the components.

The memory 420 and a portion of the computer program code 425 stored therein may be further arranged, with the processor 410, to cause the apparatus, i.e. the network node 120, to perform a method as described in the foregoing description. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method as will be described when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform the method be described. Hence, the apparatus may comprise at least one processor 410 and at least one memory 420 including the computer program code 425 for one or more programs, the at least one memory 420 and the computer program code 425 configured to, with the at least one processor 410, cause the apparatus to perform the method as described.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 425 may comprise a proprietary application, such as computer program code for participating to a detection of the topic among the messages in the manner as described.

Any of the programmed functions mentioned may also be performed in firmware or hardware adapted to or programmed to perform the necessary tasks.

Moreover, as a further remark a generation of the vector representation may be performed with a neural network trained to the task. More specifically, an applicable machine learning component may be selected for the task.

As a non-limiting example an applicable machine learning component in the context of the present invention may be a neural network based autoencoder, trained to complete a task that is elemental to the purpose of the data, and afterwards modified in such manner that its inner representations can be utilized directly as vector points. For example, if the data consists of problem descriptions, the neural network may be trained to identify the core problem behind a message from a predefined set of classes, or more specifically, predict the correct label for the message or the sub-sentence. This training may be conducted with manually labeled messages. The resulting network may be trained to extract the meaningful patterns from the message, placing more emphasis on words such as "network", "down" rather than less important words. After training, the last layer may be cut out and the second last layer's output be directly used as a vector representation of the message or sub-sentence. The resulting network may be an autoencoder, trained to give vector representations to messages or sub-sentences based on the problem behind the text.

A non-limiting example of a network architecture for the present solution explained above may e.g. comprise:
Input layer
Bidirectional LSTM layer
Convolution 2D layer
Global Max Pool 2D layer Dense layer, Linear activation Dense layer, Softmax activation.

The output of this kind of autoencoder may be used in multiple ways, two of which are standalone representation and joined representation.

Standalone representation may be understood so that the vector representation given to the sub-sentence may be applied as-is. Joined representation, in turn, may be understood so that for each sub-sentence, the initial vectorization and the autoencoder network output vectorization may be applied side-by-side, each constituting of a number of dimensions to the final representation of the sub-sentence.

If standalone representation is applied, the network is to be trained using sub-sentences. The network attempts to predict the correct label of the message, but it is given only a sub-sentence as an input.

If joined representation is applied, the network may be trained to use the entire message as input. In this case, the autoencoder would produce a representation of x dimension to the message, and sub-sentence of the message is given y dimensions from the preprocessing vectorization algorithm. The final vector representation of a sub-sentence would consist of x+y dimensions, where x dimensions represent the meaning of the entire message and y dimensions represent the meaning of the sole sub-sentence.

It is important to note that using a secondary vectorization algorithm on top of the original vectorization algorithm is not necessary, but depending on the data, may provide additional accuracy.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for performing a detection of a topic of a message introduced in a real-time customer service messaging platform, the method performed by a network node that includes a processor and communication means for communication over a network having at least a terminal for use by a customer, the method comprising:
   receiving a message, via the network, from the customer by way of the terminal;
   processing the received message to extract a topic therefrom, where the topic is extracted by:
      dividing the received message to sub-sentences,
      generating a vector representation of the sub-sentences, and
      allocating a timestamp to each vectorized sub-sentence;
   transmitting an inquiry to a database for identifying whether the extracted topic is determinable, whereby one or more of the vectorized sub-sentences are found in one or more earlier messages received and stored in the database chronologically earlier than the received message based on the timestamps allocated to each vectorized sub-sentence;
   receiving and storing an output of the inquiry from the database as a detection result indicating that the vectorized sub-sentences are found in the one or more earlier messages, the network node identifying and highlighting a topic of at least one of the one or more earlier messages based on said timestamps; and
   generating and automatically transmitting an indication to an operator of the real-time customer service messaging platform based on the detection result obtained from the database, said indication causing an output on a terminal device of the operator that the topic extracted from the received message exists in the at least one of the one or more earlier messages available in the database,
   wherein the indication causes a visual effect on a display of the terminal device of the operator of the real-time customer service messaging platform.

2. The method of claim 1, wherein the indication includes information that the extracted topic is determinable among a number of messages received chronologically earlier than the received message within a predefined time window.

3. A computer program product, recorded on a non-transitory computer-readable recording medium, for performing a detection of a topic of a message introduced in a real-time customer service messaging platform, the computer program product comprising programming code that, when executed by at least one processor of a network node, causes the network node to perform the method according to claim 1.

4. The method of claim 1, wherein the network node compares timestamps of the one or more earlier messages to highlight a message of the one or more earlier messages over other ones of the one or more earlier messages as being one of a novel topic or a repeating topic.

5. The method of claim 1, further comprising:
   downloading from the database new sub-sentences collected and periodically uploaded to the database by other network nodes to the network node and updating a vector space of the network node.

6. A network node that detects a topic of a message received in a real-time customer service messaging platform, the network node comprising:
   at least one processor;
   communication means for communicating over a network; and
   at least one memory storing computer program code for execution on the at least one processor,
   the at least one memory and the computer program code configured, with the at least one processor, to cause the network node to:
   receive a message, via the network, from a terminal of a customer;
   extract a topic from the received message, where the topic is extracted by
      dividing the received message to sub-sentences,
      generating a vector representation of the sub-sentences, and
      allocating a timestamp to each vectorized sub-sentence;
   transmit an inquiry to a database that identifies whether the extracted topic is determinable, whereby one or more of the vectorized sub-sentences are found in one or more earlier messages received and stored in the database chronologically earlier than the received message based on the timestamps allocated to each vectorized sub-sentence;
   receive and store an output of the inquiry from the database as a detection result indicating that the vectorized sub-sentences are found in the one or more earlier messages, the network node identifying and highlighting a topic of at least one of the one or more earlier messages based on said timestamps; and
   generate and transmit an indication to an operator of the real-time customer service messaging platform based on the detection result obtained from the database, said indication causing an output on a terminal device of the operator that the topic extracted from the received message exists in the at least one of the one or more earlier messages available in the database, wherein the network node is configured to transmit the indication via the network to the terminal device of the operator of the real-time customer service messaging platform, said indication configured by the network node to cause a visual effect on a display of the terminal device of the operator.

7. The network node of claim 6, wherein the indication includes information for the operator that the extracted topic is determinable among a number of messages received chronologically earlier than the received message within a predefined time window.

8. A system for performing a detection of a topic of a message introduced in a real-time customer service messaging platform, the system comprising:
- a first terminal device operable by a customer service agent;
- a second terminal device operable by a customer for contacting a customer service;
- a database that stores data relating to one or more messages delivered in the real-time customer service messaging platform; and
- the network node of claim 6.

* * * * *